Patented July 4, 1939

2,164,326

UNITED STATES PATENT OFFICE 2,164,326

COMPOSITION OF MATTER AND METHODS AND STEPS OF MAKING AND USING THE SAME

Mortimer T. Harvey, East Orange, N. J., assignor to The Harvel Corporation, a corporation of New Jersey No Drawing. Application August 24, 1935, Serial No. 37,749

6 Claims. (Cl. 106—7.5)

The present invention generally relates to friction elements such as brake elements, clutch elements, pulleys, belts and so on; and the present invention relates more particularly to friction elements which have incorporated therein a substantially infusible resin of the phenolic type in the pulverized form.

The phenolic type resin which is used in the pulverized form in the practice of the present invention is used in the state in which it is infusible and in this condition it is favorably constant in desirable characteristics at temperatures up to the carbonizing point. The characteristics of this material which are favorably constant for use in friction elements are heat conductivity and friction coefficient.

Below are given illustrative formulas of compositions embodying the present invention.

*Formula 1.*—Using parts by weight, nine parts of rubber (for example, in a 10% solution in xylol or petroleum spirit), ten parts of a heat reactive phenol-aldehyde condensation product, fifteen parts of infusible phenolic resin in the pulverized form, five parts of carbon dust, forty-five parts of asbestos fiber, five parts of litharge, ten parts metallic wire (copper, lead, either or both), and one part of sulphur are mixed together thoroughly in a dough mixer. The friction element (brake band or block, clutch facing, pulley or other part) can be molded by the cold or hot mold methods and the solvent of the rubber driven out in the curing steps or the solvent can be driven out all or in part before molding.

*Example 2.*—Ten parts of polymerized linseed oil, ten parts of heat reactive phenolic resin, seventeen parts infusible phenol-aldehyde condensation product in the pulverized form, sixty-one parts of asbestos fiber, and two parts of sulphur are mixed on a dough mixer and the desired part molded and cured.

*Example 3.*—The ingredients of Formula 1, except the asbestos fiber and metallic wire and without the solvent for the rubber are mixed on rubber mixing rolls and sheeted to a suitable thickness (for example, one-sixteenth or one-thirty-second of an inch). The sheet or strip so formed is laminated with a fabrication which comprises metal wire which has been covered with asbestos fiber and then woven into a fabric. The laminated structure is then pressed together in a mold and cured.

The reactive phenolic condensation products used in the formulas can be made of phenol, cresol or xylenol or other phenols or any mixtures thereof reacted with an agent having a methylene group such as formaldehyde, hexamethylene tetramine, paraformaldehyde and so on and these reactive phenolic resins can contain other materials such as other resins, gums, pitches and oils.

The pulverized phenolic resins used in the infusible state are generally resins of the phenol-aldehyde condensation type which are completely or substantially completely reacted so that little or no change occurs in their characteristics such as might take place due to heat generated during their use. The term pulverized is used herein to cover granules generally of the size in which fillers are used. As general examples sizes from ten mesh screen to two hundred mesh are given and as an example of a particular use the range of sizes of granules which will pass through a forty mesh screen and stay on a hundred mesh screen is given. The degree of hardness can be such as to suit the conditions of use and in some cases can be as high as that to which the resin can be cured. A measure of the hardness is readily seen from the facts that the pulverized infusible phenolic resin is used with or in place of all or part of the carbon dust for conducting heat and with or in place of all or part of the asbestos fiber as a friction element.

The various ingredients of the compositions of the examples given are used for one or more of their characteristics. The simplest composition involving the present invention would include a binder such as one or more of the rubber, reactive phenolic compound and linseed oil of the examples; and a friction constituent such as the pulverized, infusible phenolic resin. The asbestos is also used as a friction constituent and also the metallic wire. The sulphur is used for vulcanizing the rubber and the linseed oil and for other purposes. And the pulverized infusible phenolic resin can be used generally in the friction element art for its friction characteristic and its heat conductivity, the examples given are illustrative and not limiting examples.

The curing of the various compositions of the examples can be done by bringing them up gradually from room temperature to about 325° F. and back to room temperature in about sixteen hours.

The heat reactive phenolic compounds of the examples can be made with 1-4-2 xylenol with from one to two moles of formaldehyde reacted to a liquid or even to a solid condition in which they will serve as binders and further react under heat or under heat and pressure to set and hold themselves and the other ingredients in place.

Also the degree of setting can be predetermined or controlled to obtain in the parts used an optimum balance of friction characteristics and smooth and uniform contact under frictional engagement, particularly in brakes and clutches. Another example of a suitable reactive phenolic compound is a mixture of about thirty parts of phenol (carbolic acid), fifty parts of ortho-cresol and twenty parts of meta-para cresol condensed with from about one to two moles of formaldehyde.

The pulverized infusible resin can be made of the same materials as given in the paragraph above for the heat reactive phenolic compounds but in this case they are set to the infusible state before they are mixed into the compositions such as those of Examples 1, 2 and 3. This setting to the infusible state can be completed either before or after the pulverization to suit conditions of pulverizing. Also the pulverized infusible resin can be one modified by other resins or pitches, gums and oils provided the final resin is secured in the pulverized form and is infusible. Also the infusible resin and the heat reactive phenolic compound when set are resistant to oils and greases. The term infusible resin is used here to define phenolic resins in their final state of setting.

Subject matter disclosed herein but not claimed, is claimed in my copending application Serial No. 273,415, filed May 13, 1939.

What I claim and desire to protect by Letters Patent is:

1. A friction element selected from the class consisting of brakes, clutches, and pulleys and comprising an infusible phenolic resin in the pulverized form and a binder therefor, the said resin and binder being of such characteristics and of such relative proportion as to cooperate to produce an effective brake, clutch, or pulley and to maintain favorable constancy of heat conductivity and friction coefficient at temperatures from the normal up to the carbonizing point.

2. A friction element selected from the class consisting of brakes, clutches, and pulleys and comprising an infusible phenolic resin in the pulverized form and a binder therefor comprising rubber, the said resin and binder being of such characteristics and of such relative proportion as to cooperate to produce an effective brake, clutch, or pulley and to maintain favorable constancy of heat conductivity and coefficient at temperature from the normal up to the carbonizing point.

3. A friction element selected from the class consisting of brakes, clutches, and pulleys and comprising an infusible phenolic resin in the pulverized form and a binder therefor comprising rubber and sulphur, the said resin and binder being of such characteristics and of such relative proportion as to cooperate to produce an effective brake, clutch, or pulley and to maintain favorable constancy of heat conductivity and friction coefficient at temperatures from the normal up to the carbonizing point.

4. A friction element selected from the class consisting of brakes, clutches, and pulleys and comprising an infusible phenolic resin in the pulverized form and a binder therefor comprising a drying oil and sulphur, the said resin and binder being of such characteristics and of such relative proportion as to cooperate to produce an effective brake, clutch, or pulley and to maintain favorable constancy of heat conductivity and friction coefficient at temperatures from the normal up to the carbonizing point.

5. A friction element selected from the class consisting of brakes, clutches and pulleys and made from a composition comprising about nine parts by weight of rubber, ten parts of a heat-reactive phenolic resin, fifteen parts of an infusible phenolic resin in the pulverized form, five parts of carbon dust about forty-five parts of asbestos fiber, five parts of litharge, about ten parts metallic wire, and one part of sulphur, all thoroughly intermixed and cured, in which said rubber is vulcanized with said sulphur and said heat-reactive phenolic resin has been cured and in which said vulcanized rubber and said cured heat reactive phenolic resin together serving as a binder and said comminuted infusible phenolic resin being held by said binder cooperate to produce an effective brake, clutch, or pulley and to maintain favorable constancy of heat conductivity and friction coefficient at temperatures from the normal up to the carbonizing point.

6. A friction element selected from the class consisting of brakes, clutches and pulleys and made from a composition comprising about ten parts of polymerized linseed oil, ten parts of heat reactive phenolic resin, seventeen parts infusible phenolic resin in the pulverized form, sixty-one parts of asbestos fiber and two parts of sulphur, all thoroughly intermixed and cured, in which said polymerized linseed oil is vulcanized with said sulphur and said heat reactive phenolic resin has been cured and in which said vulcanized polymerized linseed oil and said cured reactive phenolic resin together as a binder and said comminuted infusible phenolic resin being held by said binder cooperate to produce an effective brake, clutch or pulley and to maintain favorable constancy of heat conductivity and friction coefficient at temperatures from the normal up to the carbonizing point.

MORTIMER T. HARVEY.